(12) United States Patent
Monden

(10) Patent No.: US 10,182,171 B2
(45) Date of Patent: Jan. 15, 2019

(54) IMAGE FORMING DEVICE, COMPUTER-READABLE RECORDING MEDIUM, AND IMAGE FORMING METHOD

(71) Applicant: Nobuya Monden, Kanagawa (JP)

(72) Inventor: Nobuya Monden, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/394,103

(22) Filed: Dec. 29, 2016

(65) Prior Publication Data

US 2017/0195516 A1  Jul. 6, 2017

(30) Foreign Application Priority Data

Jan. 6, 2016 (JP) .................. 2016-001335
Nov. 4, 2016 (JP) .................. 2016-216569

(51) Int. Cl.
| | | |
|---|---|---|
| H04N 1/32 | (2006.01) | |
| H04N 1/407 | (2006.01) | |
| H04N 1/00 | (2006.01) | |
| H04N 1/23 | (2006.01) | |
| H04N 1/34 | (2006.01) | |
| H04N 1/387 | (2006.01) | |

(52) U.S. Cl.
CPC ..... *H04N 1/32293* (2013.01); *H04N 1/00832* (2013.01); *H04N 1/2338* (2013.01); *H04N 1/344* (2013.01); *H04N 1/387* (2013.01); *H04N 1/4072* (2013.01); *H04N 2201/0081* (2013.01); *H04N 2201/0091* (2013.01)

(58) Field of Classification Search
CPC ........... H04N 1/32293; H04N 1/00832; H04N 1/2338; H04N 1/344; H04N 1/4072; H04N 2201/0081; H04N 2201/0091
USPC ........................................ 358/3.28, 1.9, 1.15
See application file for complete search history.

(56) References Cited

U.S. PATENT DOCUMENTS

| | | | | |
|---|---|---|---|---|
| 2008/0080009 A1* | 4/2008 | Masui | ................... | G06T 1/0028 358/3.28 |
| 2008/0239354 A1* | 10/2008 | Usui | .................. | G06K 9/00456 358/1.9 |
| 2010/0214584 A1* | 8/2010 | Takahashi | .......... | H04N 1/00411 358/1.9 |

(Continued)

FOREIGN PATENT DOCUMENTS

JP  11-305609  11/1999

*Primary Examiner* — Quang N Vo
(74) *Attorney, Agent, or Firm* — Oblon, McClelland, Maier & Neustadt, L.L.P.

(57) ABSTRACT

An image forming device includes: a reader configured to generate an image of a document; a setting receiving circuit configured to receive a plurality of set values on a print setting when test printing is executed for confirming a test result; an area dividing circuit configured to divide an area of an image on the read document based on number of the set values; an image processing circuit configured to perform image processing corresponding to each of the set values, on each of the divided areas; a combined image generating circuit configured to generate a combined image acquired by combining the areas of the image on the document to which the image processing corresponding to each of the set values is performed; and a printer configure to print the combined image generated by the combined image generating circuit.

18 Claims, 16 Drawing Sheets

(56) References Cited

U.S. PATENT DOCUMENTS

| | | | |
|---|---|---|---|
| 2011/0116112 A1* | 5/2011 | Muramatsu | G06T 3/4053 358/1.9 |
| 2011/0292453 A1* | 12/2011 | Saluja | B41J 11/46 358/3.28 |
| 2014/0055823 A1* | 2/2014 | Oishi | G06K 15/1892 358/3.28 |
| 2015/0070725 A1 | 3/2015 | Monden | |
| 2015/0163373 A1 | 6/2015 | Monden | |
| 2016/0077771 A1 | 3/2016 | Monden | |

* cited by examiner

FIG.4

| No. | USER SETTING | SETTABLE NUMBER | SETTABLE VALUE 1 | SETTABLE VALUE 2 | SETTABLE VALUE 3 | SETTABLE VALUE 4 | SETTABLE VALUE 5 |
|---|---|---|---|---|---|---|---|
| 1 | BACKGROUND SKIPPING | 5 | Level 1 | Level 2 | Level 3 | Level 4 | Level 5 |
| 2 | DOCUMENT TYPE | 5 | MONOCHROME BINARY (CHARACTER) | MONOCHROME BINARY (DIAGRAM) | FULL COLOR (DIAGRAM) | FULL COLOR (PHOTO-SENSITIVE PAPER PHOTOGRAPH) | GRAY SCALE |

FIG.5

| No. | SETTING CONTENT | IMAGE PROCESSING SETTING | READING SETTING | PRINT SETTING |
|---|---|---|---|---|
| 1 | BACKGROUND SKIPPING_LEVEL 1 | GAMMA CURVE_2.0 | WHITE REFERENCE DATA_A | NUMBER OF LINES TO BE PRINTED_30L |
| 2 | BACKGROUND SKIPPING_LEVEL 2 | GAMMA CURVE_2.1 | WHITE REFERENCE DATA_B | NUMBER OF LINES TO BE PRINTED_40L |
| 3 | BACKGROUND SKIPPING_LEVEL 3 | GAMMA CURVE_2.2 | WHITE REFERENCE DATA_B | NUMBER OF LINES TO BE PRINTED_50L |
| 4 | BACKGROUND SKIPPING_LEVEL 4 | GAMMA CURVE_2.3 | WHITE REFERENCE DATA_C | NUMBER OF LINES TO BE PRINTED_50L |
| 5 | BACKGROUND SKIPPING_LEVEL 5 | GAMMA CURVE_2.4 | WHITE REFERENCE DATA_D | NUMBER OF LINES TO BE PRINTED_55L |

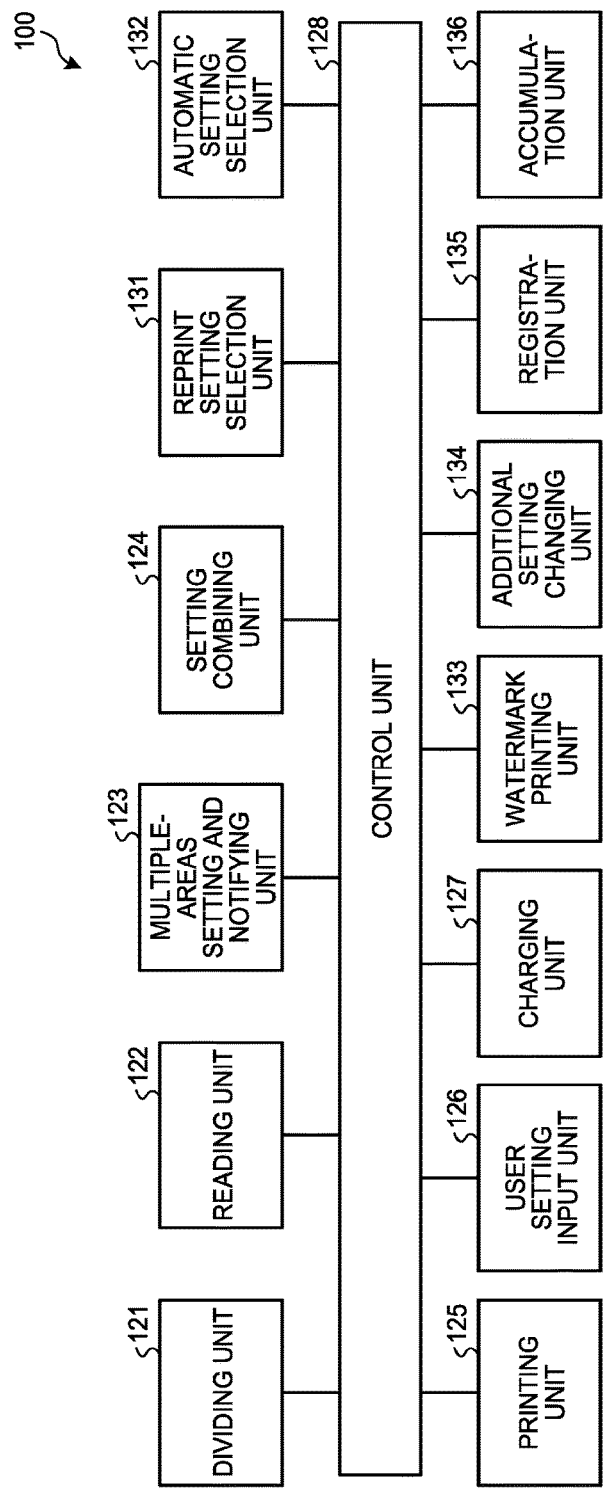

FIG.9

| | TEST PRINTING SETTING INPUT SCREEN | | | | |
|---|---|---|---|---|---|
| BACKGROUND SKIPPING | DOCUMENT TYPE | | | | |
| DIVISION NUMBER | 5 ▼ | | | | |
| AREA 1 | LEVEL 1 | LEVEL 2 | LEVEL 3 | LEVEL 4 | LEVEL 5 |
| AREA 2 | LEVEL 1 | LEVEL 2 | LEVEL 3 | LEVEL 4 | LEVEL 5 |
| AREA 3 | LEVEL 1 | LEVEL 2 | LEVEL 3 | LEVEL 4 | LEVEL 5 |
| AREA 4 | LEVEL 1 | LEVEL 2 | LEVEL 3 | LEVEL 4 | LEVEL 5 |
| AREA 5 | LEVEL 1 | LEVEL 2 | LEVEL 3 | LEVEL 4 | LEVEL 5 |
| | | | | | OK |

IMAGE FORMING DEVICE, COMPUTER-READABLE RECORDING MEDIUM, AND IMAGE FORMING METHOD

CROSS-REFERENCE TO RELATED APPLICATIONS

The present application claims priority under 35 U.S.C. § 119 to Japanese Patent Application No. 2016-001335 filed Jan. 6, 2016 and Japanese Patent Application No. 2016-216569 filed Nov. 4, 2016. The contents of which are incorporated herein by reference in their entirety.

BACKGROUND OF THE INVENTION

1. Field of the Invention

The present invention relates to an image forming device, a computer-readable recording medium, and an image forming method.

2. Description of the Related Art

In digital copying machines, an image forming device having a test copy function that allows a user to set an optimal image forming mode desired by the user, while viewing the result of the test copy has been known. However, in the traditional technology, when a user wishes to confirm an output result of an "item that needs to select a certain parameter from a plurality of set values" such as background skipping, the user needs to find a set value that can acquire an image close to the intended image, by test copying multiple times and comparing the output results.

In this example, the "background skipping" is a process of converting a density value of equal to or less than the set value, to zero. In the "background skipping", a certain set value is selected from set values at which the background is to be skipped and that are set in a stepped manner. Thus, the "background skipping" is to "select a certain parameter (Level 1) from the set values (such as background skipping set values 0 to 5)".

In the following, to simplify the explanation, a background skipping function is used to explain the function of selecting a certain parameter from the set values, for example.

A device that implements an image forming device having a test copy function that can set an optimal image forming mode desired by the user, while viewing the result of the test copy has been developed (for example, see Japanese Unexamined Patent Application Publication No. H11-305609). Japanese Unexamined Patent Application Publication No. H11-305609 discloses a method of executing and controlling a copy process of a test copy document when the copy document is conveyed, so as to provide an image forming device having a test copy function that can set an image forming mode desired by the user.

However, the problem that the user needs to test copy multiple times to confirm the optimal values of the setting items, has not been solved. Thus, there is a need to reduce the number of test copying that is required until the user confirms the intended set value.

SUMMARY OF THE INVENTION

According to exemplary embodiments of the present invention, there is provided an image forming device comprising: a reader configured to read out a document and generate an image of the read out document; a setting receiving circuit configured to receive a setting from at least two set values on a print setting, wherein, the setting receiving circuit is configured to receive a plurality of set values on the print setting when test printing is executed for confirming a test result; an area dividing circuit configured to divide an area of an image on the document that is generated by the reader, based on number of the set values received by the setting receiving circuit; an image processing circuit configured to perform image processing corresponding to each of the set values, on each of a plurality of areas of the image on the document, the areas being divided by the area dividing circuit; a combined image generating circuit configured to generate a combined image acquired by combining the areas of the image on the document to which the image processing corresponding to each of the set values is performed by the image processing circuit; and a printer configured to print the combined image generated by the combined image generating circuit.

Exemplary embodiments of the present invention also provide a non-transitory computer-readable recording medium that contains a computer program that causes a computer to execute: reading out a document and generating an image on the document; receiving a setting from at least two set values on a print setting, and receiving a plurality of set values on the print setting when test printing is executed for confirming a test result; dividing an area of the image on the read document, based on number of the received set values; performing image processing corresponding to each of the set values, on each of the divided areas; generating a combined image acquired by combining the areas of the image on the document to which the image processing corresponding to each of the set values is performed; and printing the generated combined image.

Exemplary embodiments of the present invention also provide an image forming method comprising: reading out a document and generating an image on the document; receiving a setting from at least two set values on a print setting, and receiving a plurality of set values on the print setting when test printing is executed for confirming a test result; dividing an area of the image on the read document, based on number of the received set values; performing image processing corresponding to each of the set values, on each of the divided areas; generating a combined image acquired by combining the areas of the image on the document to which the image processing corresponding to each of the set values is performed; and printing the generated combined image.

BRIEF DESCRIPTION OF THE DRAWINGS

FIG. 4 is a diagram illustrating data structure table showing items that are settable by a user at the time of test copying are managed;

FIG. 5 is a diagram illustrating data structure table showing details of the values of the setting items shown in FIG. 4;

FIG. 6 is an example of a functional block diagram of the image forming device illustrated in FIG. 3;

FIG. 9 is a diagram illustrating an example of a selection input screen according to the embodiment;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
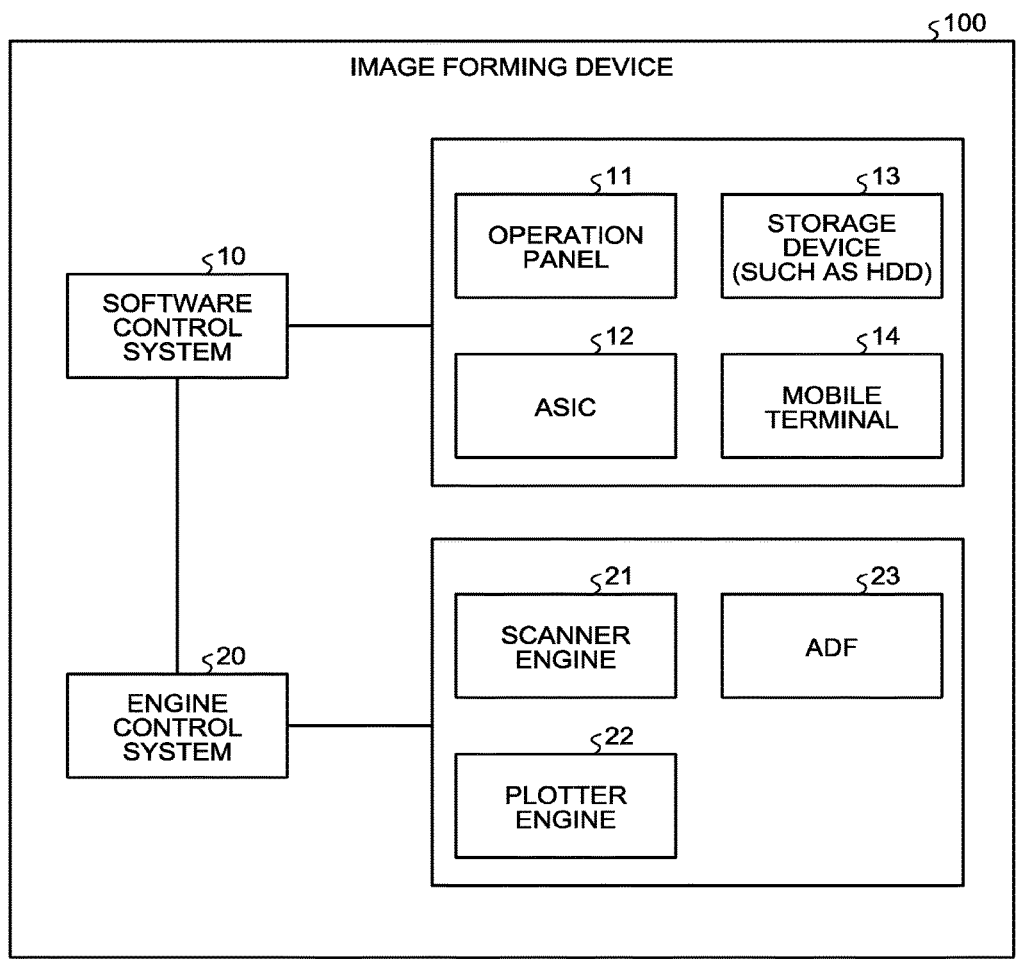
FIG. 1 is a block diagram illustrating an example of a module configuration of an image forming device according to an embodiment of the present invention.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

Overview

FIG. 1 is a block diagram illustrating an example of a module configuration of an image forming device 100 according to an embodiment of the present invention. Whether components of the embodiment, which will be described below, are to be classified into a software control system 10 or an engine control system 20 depends on whether the component performs physical reading or printing.

The software control system 10 provides and reflects a user set value, or stores and processes read data. Examples of the module of the software control system 10 include an operation panel 11, an application specific integrated circuit (ASIC) 12, a storage device 13, a mobile terminal 14, and the like. The operation panel 11 receives an operation from a user. The ASIC 12 performs image processing on a read image. The storage device 13 such as a hard disk drive (HDD) stores therein data. The mobile terminal 14 is used for operating a device.

The engine control system 20 is a system that controls the mechanism required for forming an image, such as a scanner engine 21 and a plotter engine 22. Examples of the module of the engine control system 20 include the scanner engine 21, the plotter engine 22, an auto document feeder (ADF) 23, and the like. An image sensor such as a complementary metal oxide semiconductor (CMOS) is mounted on the scanner engine 21. A transfer device is mounted on the plotter engine 22. The ADF 23 feeds documents.

Figure 2:
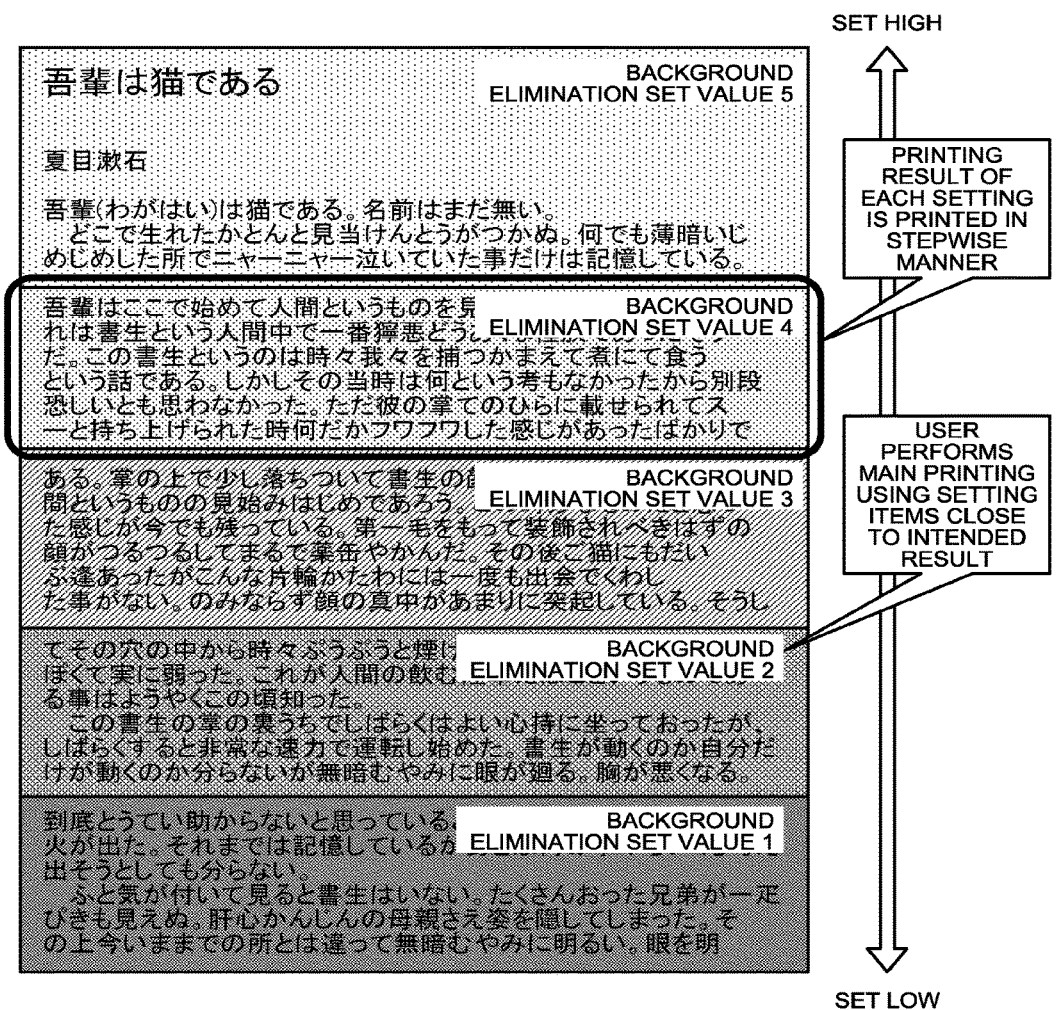
FIG. 2 is a diagram for explaining an overview of the embodiment.

FIG. 2 is a diagram for explaining an overview of the embodiment. FIG. 2 is an example of a Japanese-displayed novel "I am a cat" by Soseki Natsume printed by the image forming device 100 according to the embodiment. The printing result of each setting is printed in descending order of background elimination set value. The user can perform the main printing using the setting items close to the intended result.

When density value is changed while density of 0% is white and density of 100% is black, the following applies under the definition of the background skipping described above.

When the set value is low (such as 10%):

When the portions where the density of 10% or less all become white, the gray portions with the density of 11% or more are left as they are (set value 5: image with a high set value).

When the set value is high (such as 80%):

When the portions where the density of 80% or less all become white, only the portions with the density of 81% or more (substantially black) remains (set value 1: image with a low set value).

First Embodiment

Hardware Configuration

Figure 3:
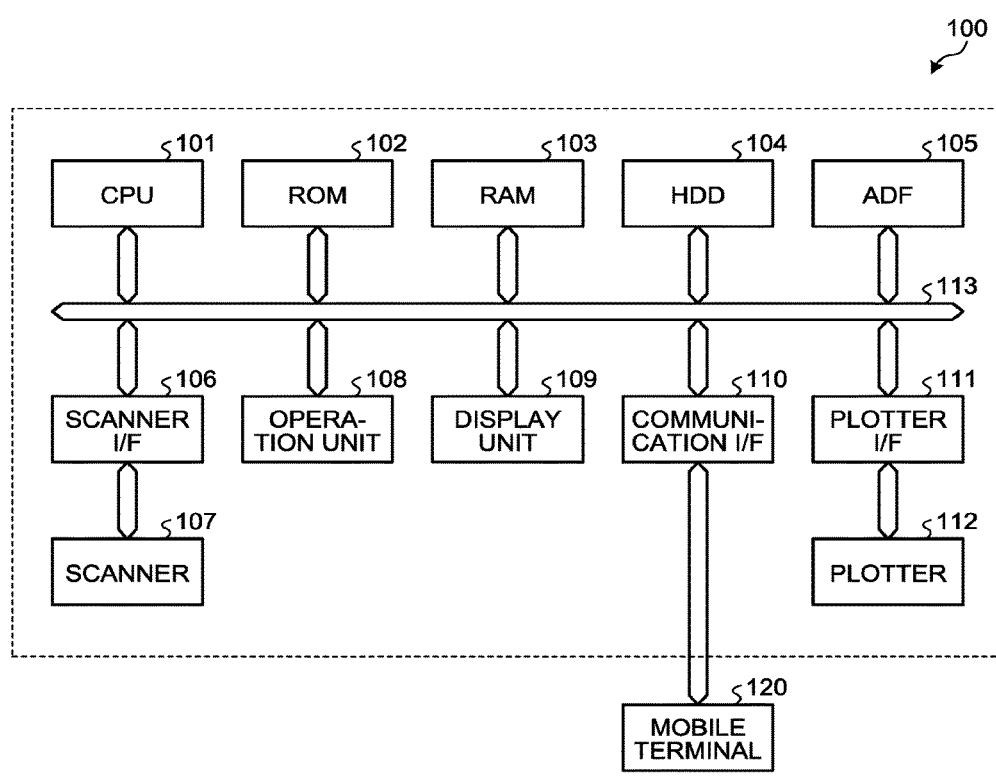
FIG. 3 is an example of a hardware block diagram illustrating the embodiment.

FIG. 3 is an example of a hardware block diagram illustrating the embodiment. The image forming device 100 includes a central processing unit (CPU) 101, a read only memory (ROM) 102, a random access memory (RAM) 103, an HDD 104, an ADF 105, and a scanner interface (I/F) 106. In addition to the above, the image forming device 100 includes a scanner 107, an operation unit 108, a display unit 109, a communication I/F 110, a plotter I/F 111, and a plotter 112. The units described above are connected via a bus line 113. The communication I/F 110 of the image forming device 100 can be connected to a mobile terminal 120.

The CPU 101 is a component that generally controls the image forming device 100, and has a function of executing a main program. The ROM 102 is a component that stores therein the main program and a sub-program, and may be a mask ROM, for example. The RAM 103 is a component that develops computer programs read out from the ROM 102, and may be a flash memory, for example. The HDD 104 is a device that stores therein print data including image data.

The ADF 105 is a device that automatically feeds a document in the printing device, scanner, and the like. The scanner I/F 106 is a device that receives and transmits data by connecting to the scanner 107. The scanner 107 is a device that reads out reflection light acquired by irradiating a document with light using a charge coupled device (CCD), and that converts the reflection light to an electric signal.

The operation unit 108 is a device that includes various switches such as a power switch, a numeric keypad, a start button, a reset button, and the like that are required when a user operates the image forming device 100. The display unit 109 has a function of displaying items that are required when the user operates the image forming device 100. The display unit 109 is a device that displays the number of sheets to be printed, size of the printing sheet, reduction/enlargement size, document type, printing density, and the like. It is also possible to use a touch panel in which the operation unit 108 and the display unit 109 are integrated.

The communication I/F 110 is a device that receives and transmits data, by connecting between the image forming device 100 and the mobile terminal 120. The plotter I/F 111 is a device that receives and transmits data by connecting with the plotter 112. The plotter 112 is a device that prints the document read out by the scanner 107.

The mobile terminal 120 is a device that operates the image forming device 100 by connecting to the image forming device 100. The image forming device 100 can print image data and character data acquired by the mobile terminal 120 via the Internet.

Data Configuration

Examples of information managed by the software control system 10 will now be described.

FIG. 4 is a diagram illustrating data structure table (hereinafter, referred to data structure table 1) showing items that are settable by a user at the time of test copying are managed.

FIG. 5 is a diagram illustrating data structure table (hereinafter, referred to data structure table 2) showing details of the values of the setting items. I the data structure table 2, print parameters required for copying relative to the items set by the user, are managed. In these examples shown in the data structure tables 1 and 2, the user can select either one of "background skipping" and "document type" at the time of test printing. When the user selects the "background skipping", test copying is executed on five divided areas on a single sheet of paper, and printing corresponding to the "image processing setting, reading setting, and print setting" is performed on each area.

Software Configuration

FIG. 6 is an example of a functional block diagram of the image forming device 100 illustrated in FIG. 3. The image forming device 100 includes a dividing unit 121, a reading unit 122, a multiple-areas setting and notifying unit 123, a setting combining unit 124, a printing unit 125, a user setting input unit 126, a charging unit 127, and a control unit 128. In addition to the above, the image forming device 100 also includes a reprint setting selection unit 131, an automatic setting selection unit 132, a watermark printing unit 133, an additional setting changing unit 134, a registration unit 135, and an accumulation unit 136.

The dividing unit 121 is a unit that divides an area of an image on a document that is read out by the reading unit 122, depending on the number of settings used for printing out the image of the read document. The dividing unit 121 is implemented by the CPU 101, the ROM 102, and the RAM 103 illustrated in FIG. 3. The reading unit 122 is a unit that reads out the document, and is implemented by the scanner 107 illustrated in FIG. 3.

The printing unit 125 is a unit that prints image data and character data, and is implemented by the plotter 112 illustrated in FIG. 3. The control unit 128 is a unit that generally controls the image forming device 100, and is implemented by the CPU 101, the ROM 102, and the RAM 103 illustrated in FIG. 3. The multiple-areas setting and notifying unit 123 is a unit that sets a plurality of areas, and notifies the areas to the printing unit 125. The multiple-areas setting and notifying unit 123 is implemented by the CPU 101, the ROM 102, and the RAM 103 illustrated in FIG. 3.

The setting combining unit 124 is a unit that sends the read data to the multiple-areas setting and notifying unit 123, and is implemented by the CPU 101, the ROM 102, and the RAM 103 illustrated in FIG. 3. The charging unit 127 confirms the charging state, and if it is not charged, the charging unit 127 will charge, and if it is charged, the charging unit 127 will not charge. The charging unit 127 is implemented by the CPU 101, the ROM 102, and the RAM 103 illustrated in FIG. 3. The user setting input unit 126 is a unit that sends a reading instruction to the reading unit 122; that sends an instruction to perform image processing (reduction), in other words, a dividing instruction, to the dividing unit 121; and that sends a printing instruction to the printing unit 125. The user setting input unit 126 is implemented by the CPU 101, the ROM 102, and the RAM 103 illustrated in FIG. 3.

The printing unit 125 is a unit that executes printing, and is implemented by the plotter 112 illustrated in FIG. 3. The reprint setting selection unit 131 is a unit that selects reprinting, and is implemented by the CPU 101, the ROM 102, and the RAM 103 illustrated in FIG. 3. The automatic setting selection unit 132 is a unit that automatically performs various settings, and is implemented by the CPU 101, the ROM 102, and the RAM 103 illustrated in FIG. 3.

The watermark printing unit 133 is a unit that prints a watermark at the time of print out, and is implemented by the plotter 112 illustrated in FIG. 3. The additional setting changing unit 134 is a unit that adds and changes the setting items at the time of reprint, and is implemented by the CPU 101, the ROM 102, and the RAM 103 illustrated in FIG. 3. The registration unit 135 is a unit for registering an association between the set value and the divided areas at the time of test printing, the registration of which is made by the user in advance. The registration unit 135 is implemented by the operation unit 108 and the display unit 109 illustrated in FIG. 3.

The accumulation unit 136 is a unit that accumulates test print data, and is implemented by the HDD 104 illustrated in FIG. 3.

First Operation

Figure 7:
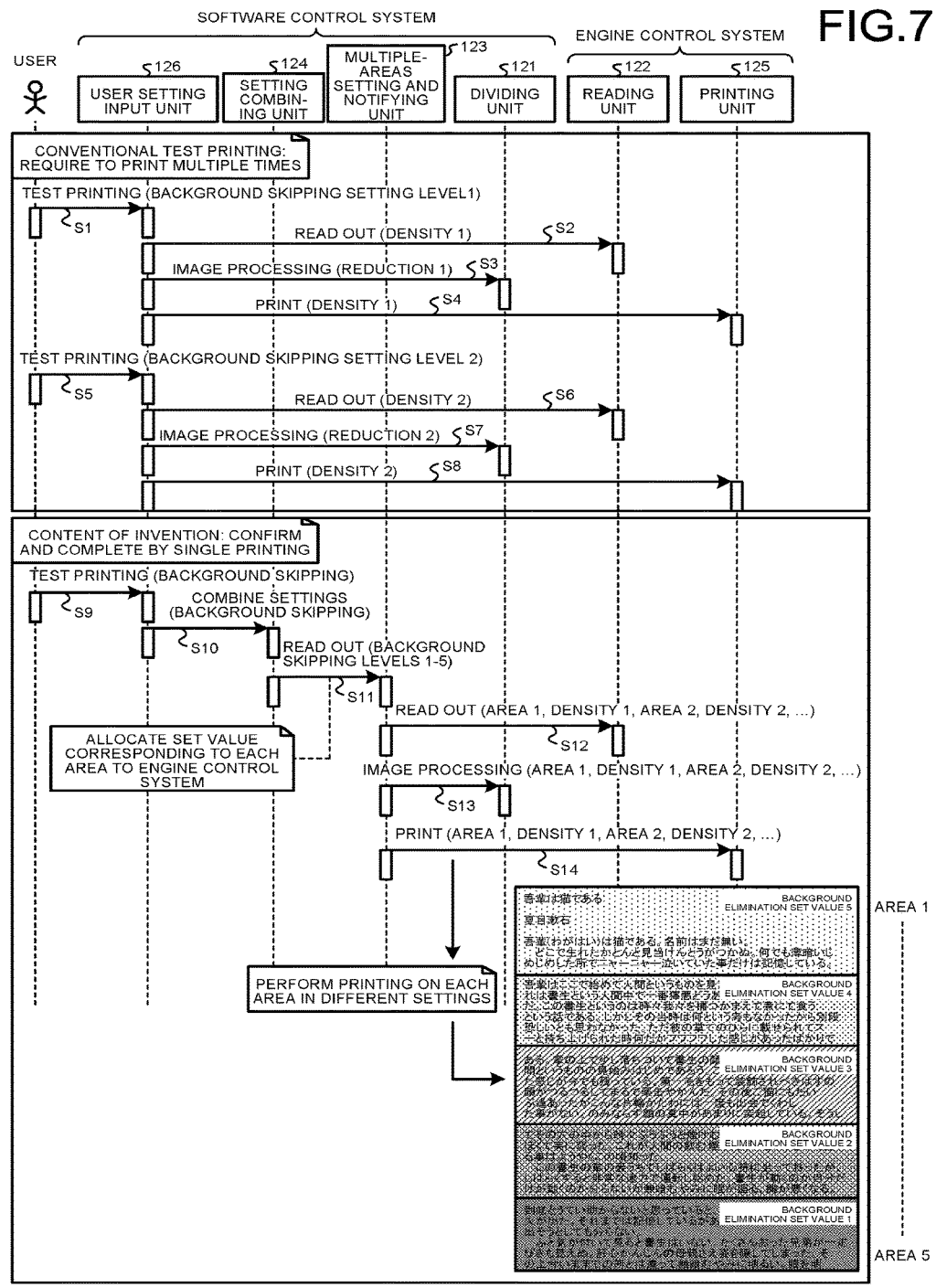
FIG. 7 is a sequence diagram of requests and responses exchanged between a user and a user setting input unit, a setting combining unit, a multiple-areas setting and notifying unit, a dividing unit, a reading unit, and a printing unit in the image forming device illustrated in FIG. 6.

FIG. 7 is a sequence diagram of requests and responses exchanged between a user and the user setting input unit 126, the setting combining unit 124, the multiple-areas setting and notifying unit 123, the dividing unit 121, the reading unit 122, and the printing unit 125 in the image forming device 100 illustrated in FIG. 6. In the following, illustration of the control unit 128 is omitted. The sequence diagram illustrated in FIG. 7 indicates a "printing operation from when a user performs test printing to when the user finds an image (or settings) desired by the user". The sequence is roughly divided into two operations of a "printing operation using a conventional technique" and a "printing operation in the present embodiment". In the "printing operation using a conventional technique", test copying is performed by reflecting the set values corresponding to the settings set by the user, on three units of ([image processing control unit]/[reading control unit]/[printing control unit]) that are required for copying.

In the "printing operation in the present embodiment", test copying is performed by reflecting a "plurality" of the set values on the three units, by using the setting combining unit 124 and the multiple-areas setting and notifying unit 123. The set values are used to copy the areas that are acquired by dividing the sheet surface, so as to display a plurality of printing results on a single surface of a printing sheet. As a result, the user can confirm the result of test copying intended by the user on a single sheet of paper, by test copying only once. Hereinafter, the above will now be described with reference to the sequence diagram.

Conventional Example

Conventionally, when a user performs test printing, the user needs to print multiple times. In other words, when test printing is performed (background skipping setting Level 1: step S1), the user setting input unit 126 instructs the reading unit 122 to read out (density 1: step S2). The user setting input unit 126 instructs the dividing unit 121 to perform image processing (reduction 1: step S3). The user setting input unit 126 instructs the printing unit 125 to print (density 1: step S4). When the user instructs the user setting input unit 126 to perform test printing (background skipping setting Level 2: step S5), the user setting input unit 126 instructs the reading unit 122 to read out (density 2: step S6). The user setting input unit 126 instructs the dividing unit 121 to perform image processing (reduction 2: step S7), and instructs the printing unit 125 to print (density 2: step S8).

Present Embodiment

Compared to the conventional example above, in the present embodiment, the result can be confirmed and completed by printing once. In other words, when a user instructs the user setting input unit 126 to perform test printing (background skipping: step S9), the user setting input unit 126 instructs the setting combining unit 124 to combine the settings (background skipping: step S10). The setting combining unit 124 instructs the multiple-areas setting and notifying unit 123 to read out. At this point, a set value corresponding to each area is distributed to the engine control system 20 (background skipping Levels 1 to 5: step S11). The multiple-areas setting and notifying unit 123 instructs the reading unit 122 to read out (area 1, density 1, area 2, density 2, . . . : step S12), and instructs the dividing unit 121 to perform image processing (area 1, density 1, area 2, density 2, . . . : step S13). The multiple-areas setting and notifying unit 123 instructs the printing unit 125 to print (area 1, density 1, area 2, density 2, . . . : step S14). As a result, printing is performed on each area in different settings, and as the diagram illustrated at the bottom-right corner in FIG. 7, the area 1 to the area 5 are printed on a single sheet of paper, on which a background skipping process corresponding to each of the density 1 to density 5 is performed.

Details of Image Processing

Figure 8:
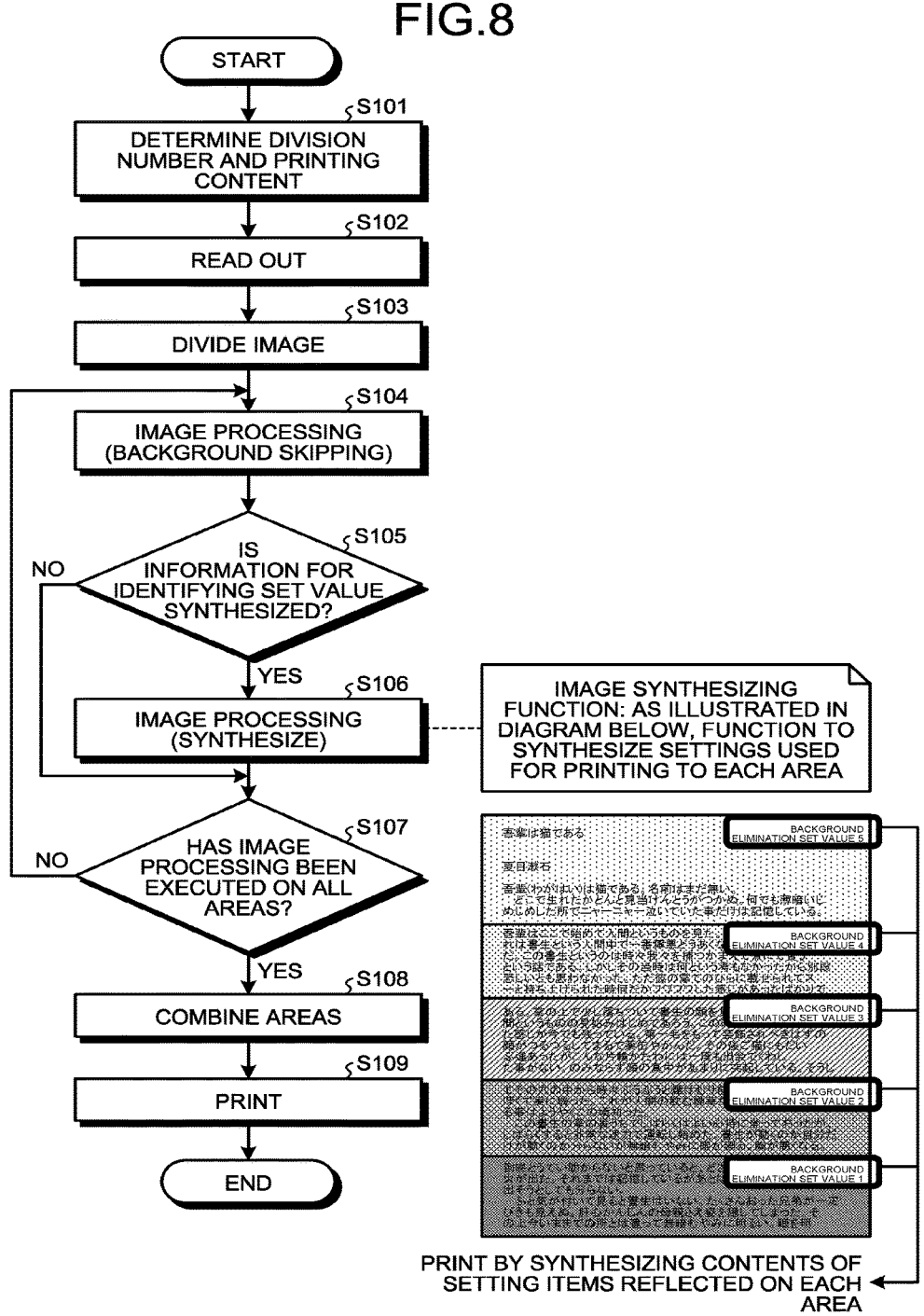
FIG. 8 is a flowchart for explaining an example of image processing according to the embodiment.

FIG. 8 is a flowchart for explaining an example of image processing according to the embodiment.

As illustrated in FIG. 8, the image forming device 100 determines the division number of the area of the image on the document as well as the printing content of each area (step S101). For example, the user performs print settings to execute test printing for confirming the printing result. The print settings include at least two set values. Consequently, the image forming device 100 receives a plurality of set values for the print settings, and determines the division number of the area of the image on the document and the printing content of each area, depending on the number of set values. The image forming device 100 then reads out the document and generates an image on the document (step S102). Then, the image forming device 100 divides the area of the image on the generated document, depending on the determined division number (step S103).

Next, the image forming device 100 executes image processing (background skipping) on the divided areas (step S104). The image forming device 100 then determines whether to synthesize information for identifying the set value (step S105). The information for identifying the set value is an image (set value identification image) that indicates the background skipping level (background elimination level) of each area. Whether to synthesize the image can be specified when the user performs the print settings. When the image indicating the background skipping level is to be synthesized (Yes at step S105), the image forming device 100 executes image processing of synthesizing the image (step S106). When the image indicating the background skipping level is not to be synthesized (No at step S105), the image forming device 100 executes a process at step S107.

The image forming device 100 determines whether image processing is executed on all the areas (step S107). When image processing is executed on all the areas (Yes at step S107), the image forming device 100 generates a combined image that is acquired by combining the areas of the image on the document to which the image processing is executed (step S108). The image forming device 100 then prints the combined image (step S109). When image processing is not executed on all the areas (No at step S107), the image forming device 100 returns to step S104, and executes image processing on the areas not being processed.

FIG. 9 is a diagram illustrating an example of a selection input screen according to the embodiment. The selection input screen is a screen for entering the settings of the background skipping (or document type) at the time of test printing. As illustrated in FIG. 9, the selection input screen includes the division number corresponding to the number of print settings, and objects for selecting and entering the background skipping level of each of the areas corresponding to the division number. The user can select the background skipping level (level 1 to level 5) on each area. The user can also set any division number. For example, when the division number is set to "two", the selection input screen is switched to a selection input screen for selecting the background skipping levels (level 1 to level 5) of the area 1 and area 2. Thus, the image forming device 100 executes image processing based on the background skipping levels being set by the division number of "two".

Figure 10:
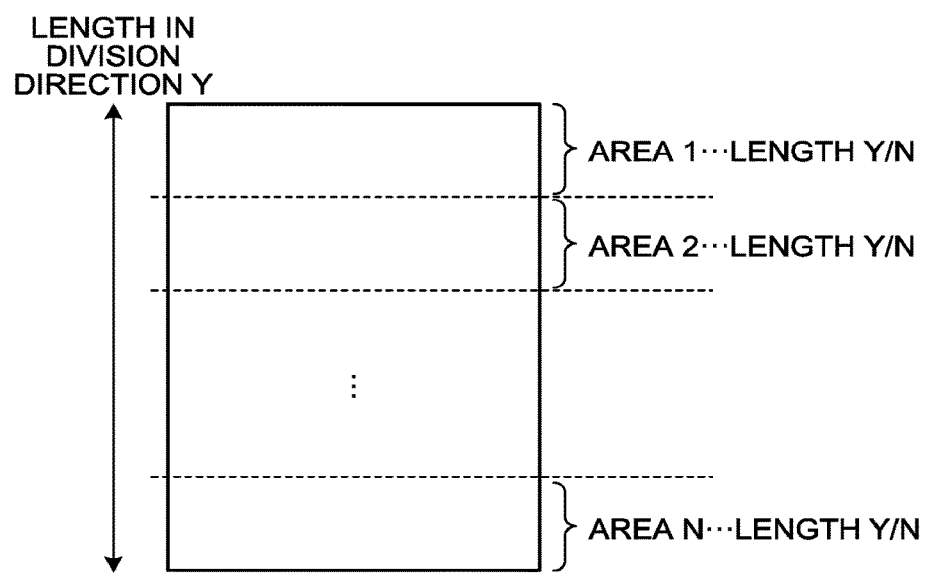
FIG. 10 is a diagram for explaining an example of determining areas depending on the division number according to the embodiment.

FIG. 10 is a diagram for explaining an example of determining areas depending on the division number according to the embodiment. In the example illustrated in FIG. 10, the length of an image on a document in a division direction is "Y", and the division number corresponding to the number of print settings is "N". The length "Y" of the image on the document in the division direction is determined based on a recording medium to be printed (such as a printing sheet), the printing direction (vertical direction or horizontal direction), and the like. When the print settings are set, the image forming device 100 determines "Y/N" that is acquired by dividing the length "Y" in the division direction by the division number "N", as the length of the areas. As described above, when the user has determined the division number, the division number determined by the user is "N".

Second Operation

Figure 11:
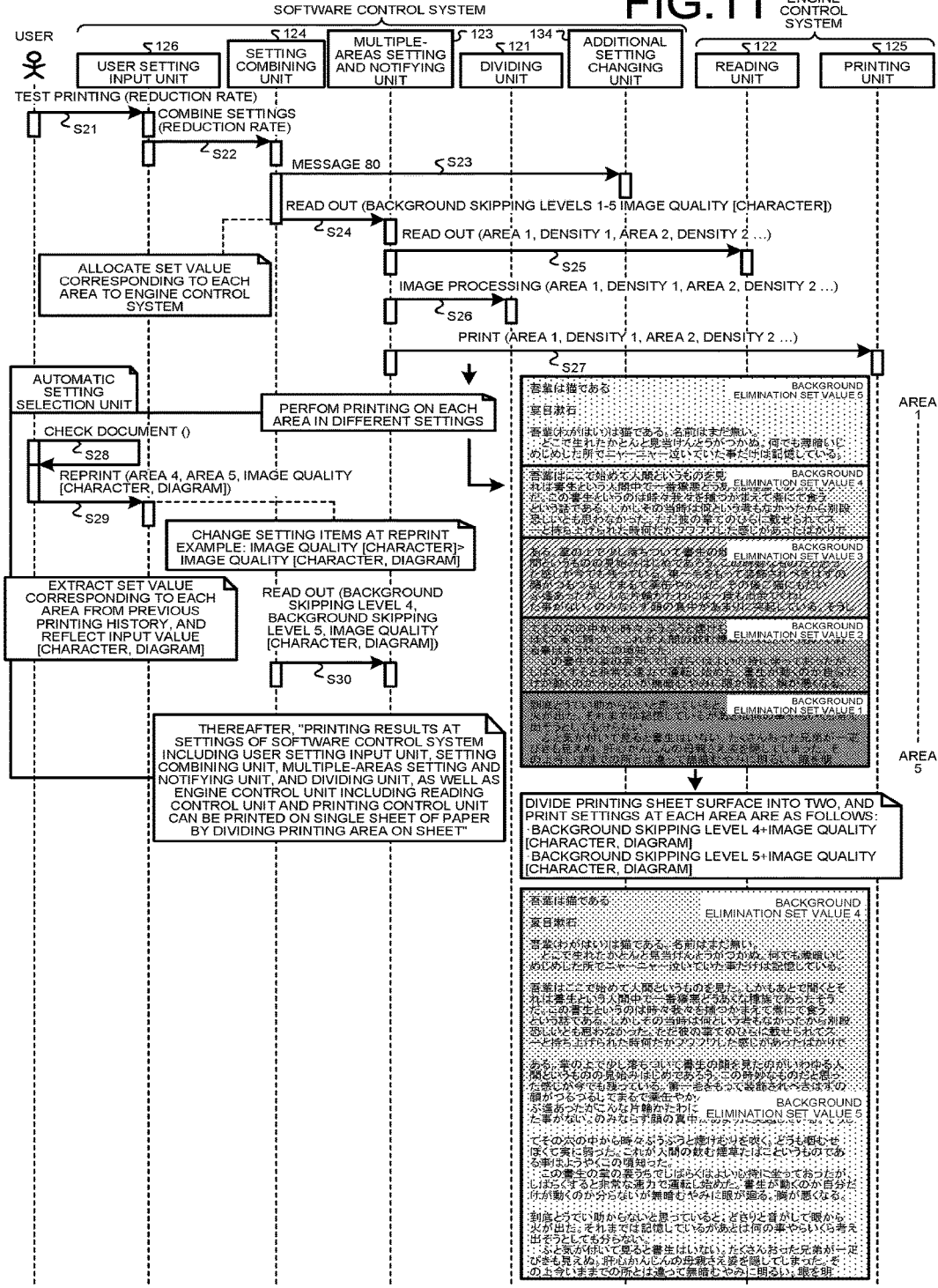
FIG. 11 is a sequence diagram of requests and responses exchanged between the user and the user setting input unit, the setting combining unit, the multiple-areas setting and notifying unit, the dividing unit, an additional setting changing unit, the reading unit, and the printing unit in the image forming device illustrated in FIG. 6.

FIG. 11 is a sequence diagram of requests and responses exchanged between the user and the user setting input unit 126, the setting combining unit 124, the multiple-areas setting and notifying unit 123, the dividing unit 121, the additional setting changing unit 134, the reading unit 122, and the printing unit 125 in the image forming device 100 illustrated in FIG. 6.

When test printing is performed once, and even though there are portions printed close to the intended image, when the user wishes to compare the images in more detail, it is possible to compare the difference between the set values in more detail, by narrowing down the setting items (number of areas to be printed) and reprinting the image.

When a user performs test printing, the user sets test printing (reduction rate: step S21) in the user setting input unit 126 (step S21). The user setting input unit 126 instructs the setting combining unit 124 to combine the settings (reduction rate) (step S22). The setting combining unit 124 sends a message to the additional setting changing unit 134 (step S23), and instructs the multiple-areas setting and notifying unit 123 to read out (background skipping Levels 1 to 5, image quality [character]). The set value corresponding to each area is allocated to the engine control system 20 (step S24). The multiple-areas setting and notifying unit 123 instructs the reading unit 122 to read out (area 1, density 1, area 2, density 2, . . . ) (step S25), and instructs the dividing unit 121 to perform image processing (area 1, density 1, area 2, density 2, . . . ) (step S26). The multiple-areas setting and notifying unit 123 then instructs the printing unit 125 to print (area 1, density 1, area 2, density 2, . . . ) (step S27).

The additional setting changing unit 134 will now be described. The additional setting changing unit 134 extracts the set value corresponding to each of the areas from the printing history and reflects an input value [character, diagram]. The user checks the document (step S28), and instructs the user setting input unit 126 to reprint (area 4, area 5, image quality [character, diagram]). The user changes the setting items so that the image quality is image quality [character]>image quality [character, diagram] at the time of reprint (step S29). The setting combining unit 124 instructs the multiple-areas setting and notifying unit 123 to read out (background skipping setting, Level 4, background skipping Level 5, image quality [character, diagram]) (step S30). Thereafter, the printing results acquired at the settings of the software control system 10 that includes the user setting input unit 126, the setting combining unit 124, the multiple-areas setting and notifying unit 123, and the dividing unit 121, as well as the engine control system 20 that includes the reading unit 122 and the printing unit 125 can be printed on a single sheet of paper by dividing the printing area. By printing the results on each area in different settings, as illustrated in the right side of FIG. 9, a diagram in which the density 1 to density 5 respectively correspond to the areas 1 to 5 is to be printed on the sheet of paper. Also, as the diagram at the bottom right of FIG. 11, when the printing sheet surface is divided into two, and the print settings in each area are changed so that the print settings are background skipping Level 4+image quality [character, diagram], and background skipping Level 5+image quality [character, diagram], a diagram corresponding to the density 4 and the density 5 is to be printed on the sheet of paper.

Third Operation

Figure 12:
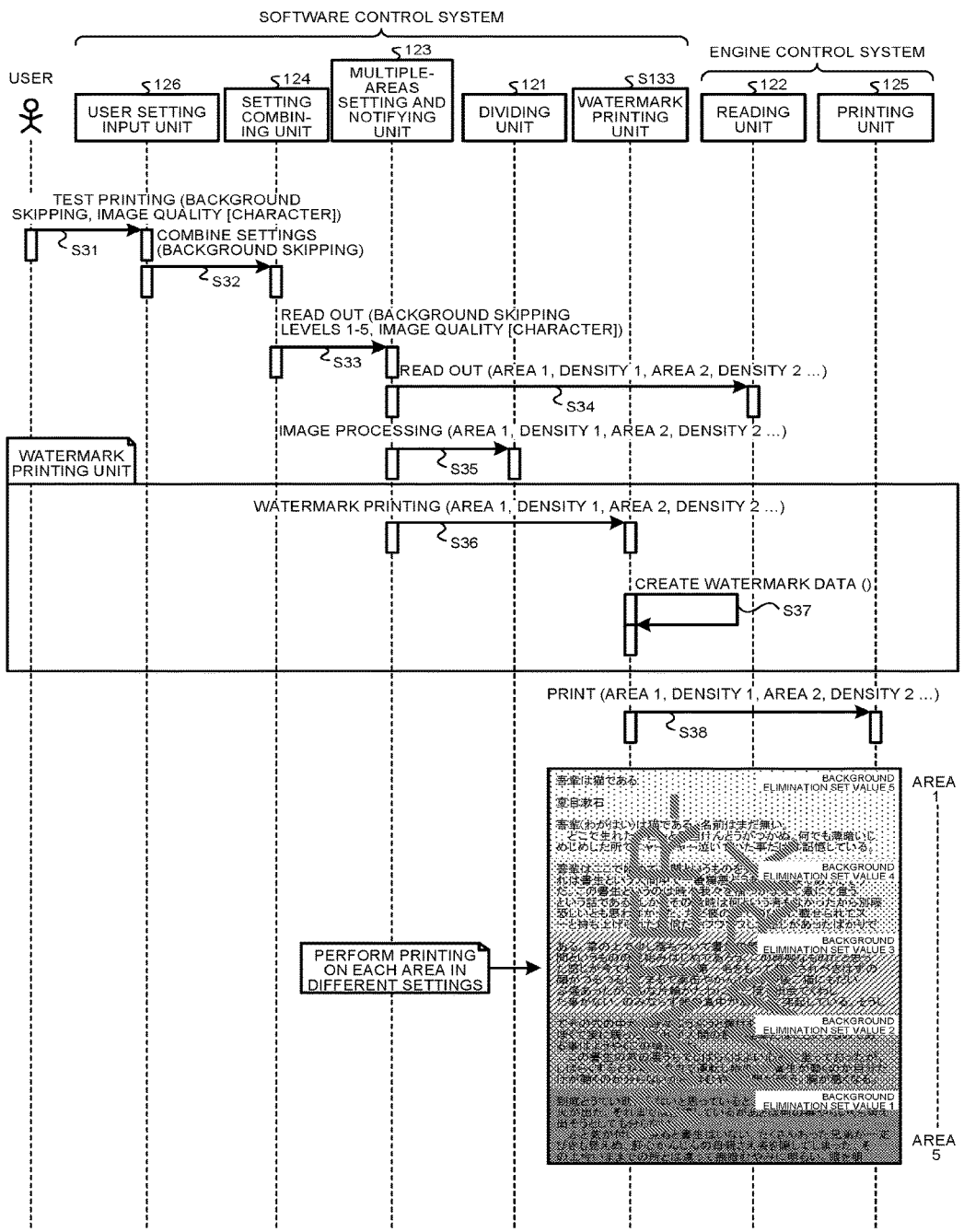
FIG. 12 is a sequence diagram of requests and responses exchanged between the user and the user setting input unit, the setting combining unit, the multiple-areas setting and notifying unit, the dividing unit, a watermark printing unit, the reading unit, and the printing unit in the image forming device illustrated in FIG. 6.

FIG. 12 is a sequence diagram of requests and responses exchanged between the user and the user setting input unit 126, the setting combining unit 124, the multiple-areas setting and notifying unit 123, the dividing unit 121, the watermark printing unit 133, the reading unit 122, and the printing unit 125 in the image forming device 100 illustrated in FIG. 6.

Even when copying is executed on each area in different settings, it is possible to print a watermark that spreads across the continuous areas on a single sheet of paper, by printing the watermark corresponding to the settings of each area. Consequently, the fact that the print is a test print may be reflected on the printing result as a watermark, thereby preventing unauthorized utilization of the test print.

When a user performs test printing (background skipping, image quality [character]), the user instructs the user setting input unit 126 to perform test printing (step S31). When the user setting input unit 126 instructs the setting combining unit 124 to combine the settings (background skipping, step S32), the setting combining unit 124 instructs the multiple-areas setting and notifying unit 123 to read out (background skipping, Levels 1 to 5, image quality [character]) (step S33). The multiple-areas setting and notifying unit 123 instructs the reading unit 122 to read out (area 1, density 1, area 2, density 2, . . . ) (step S34), and instructs the dividing unit 121 to perform image processing (area 1, density 1, area 2, density 2, . . . ) (step S35).

The watermark printing unit 133 will now be described. When the multiple-areas setting and notifying unit 123 instructs the watermark printing unit 133 to perform watermark printing (area 1, density 1, area 2, density 2, . . . ) (step S36), the watermark printing unit 133 creates watermark data (step S37). The watermark printing unit 133 instructs the printing unit 125 to print (area 1, density 1, area 2, density 2, . . . ) (step S38). Consequently, as illustrated in the right bottom of FIG. 12, an image and a watermark corresponding to the density 1 to density 5 are printed on the areas 1 to 5 on the sheet of paper.

In the watermark printing, depending on the division number, an area not including the watermark data may be generated. For example, when the division number is increased, the watermark data may not be included on the upper side and the lower side of the sheet of paper. In the present embodiment, as will be describe below, the watermark data is to be included in all the areas.

Figure 13:
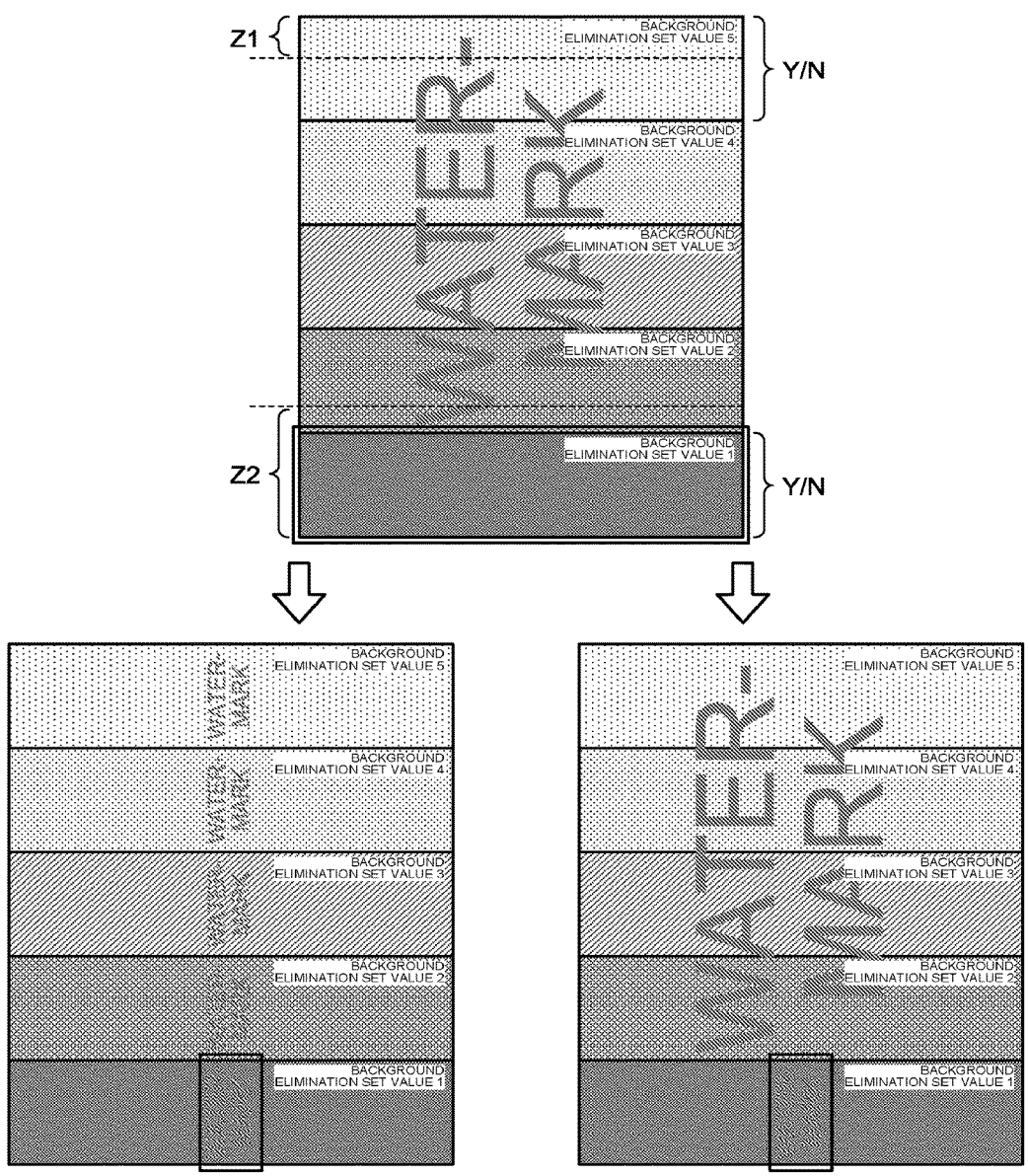
FIG. 13 is a diagram for explaining examples of watermark according to the embodiment.

FIG. 13 is a diagram for explaining examples of watermark according to the embodiment. As illustrated in the upper diagram of FIG. 13, watermark data is not included in the area where the background skipping level is "1" (background elimination set value is "1"). Whether the area does not include the watermark data can be determined based on the position (size) of the watermark data relative to the sheet of paper.

For example, based on the position of the watermark data relative to the sheet of paper, the image forming device 100 calculates length "Z1" from the top end of the sheet to the upper end of the watermark data, and length "Z2" from the lower end of the sheet to the lower end of the watermark data, in the division direction. The image forming device 100 determines whether there is an area not including the watermark data, by comparing between "Z1" and "Z2", and the length of each area (Y/N described above).

More specifically, when it is "Z1≥Y/N", the image forming device 100 determines that the watermark data is not included in the area at the upper end of the sheet. Similarly, when it is "Z2≥Y/N", the image forming device 100 determines that the watermark data is not included in the area at the lower end of the sheet. To what extent the watermark data is not included (spreads across how many areas from the area at the end of the sheet) can be determined by comparing between "Z1 (or Z2)" and "2Y/N", as well as comparing between "Z1 (or Z2)" and "3Y/N".

When there is an area not including the watermark data, the image forming device 100 corrects the watermark data so that all the areas include the watermark data. For example, as illustrated in the lower left diagram of FIG. 13, the image forming device 100 synthesizes the watermark data on each of the areas, instead of the watermark data that spreads across the areas. Consequently, the watermark data is included in the area where the background skipping level is "1" (background elimination set value is "1").

When there is an area not including the watermark data, the image forming device 100 adds new watermark data so that all the areas include the watermark data. As illustrated in the lower right diagram of FIG. 13, the image forming device 100 synthesizes new watermark data on the area not including the watermark data, in addition to the watermark data that spreads across the areas. Consequently, the watermark data is included in the area where the background skipping level is "1" (background elimination set value is "1").

Details of Watermark Printing Process

Figure 14:
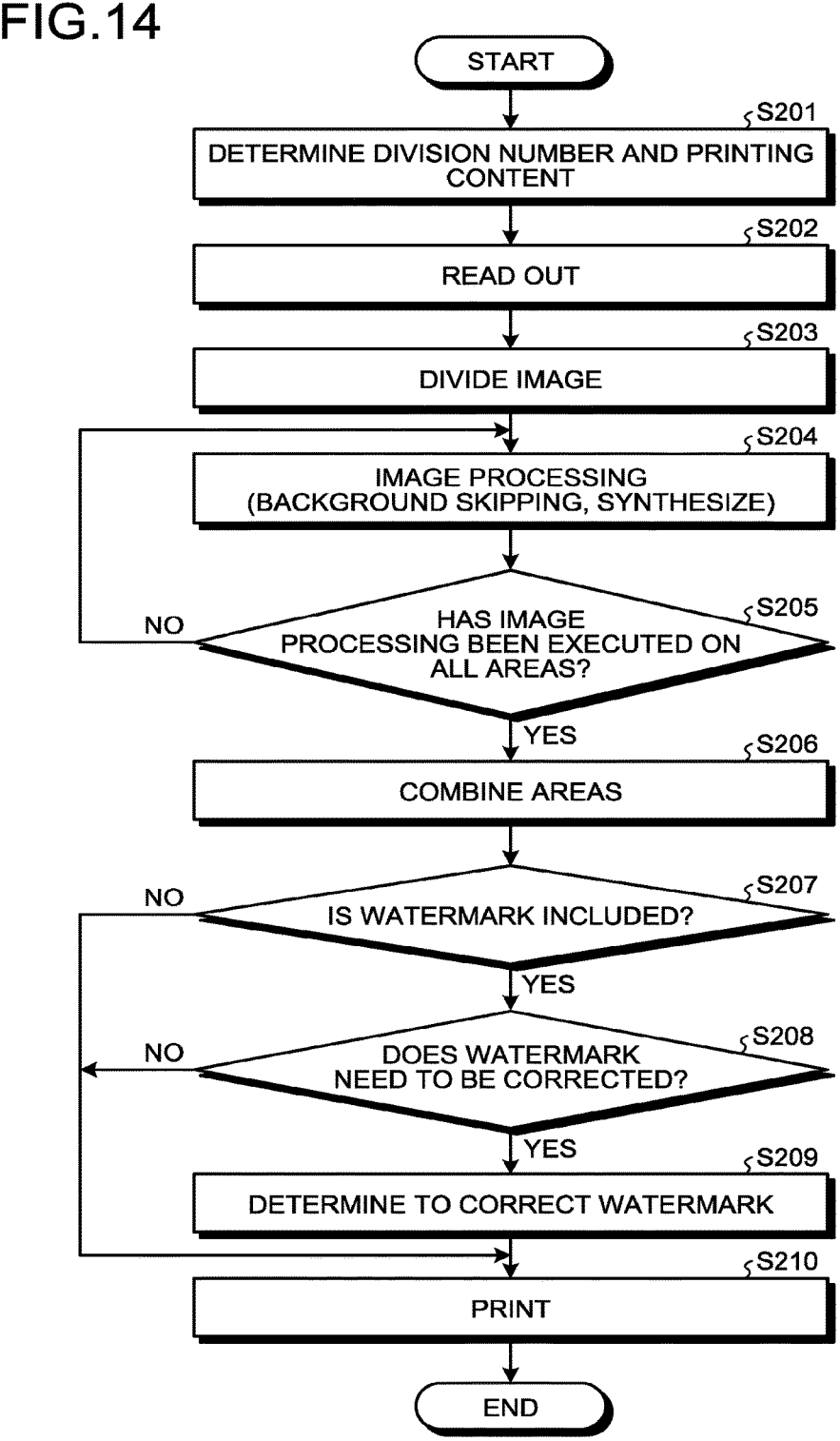
FIG. 14 is a flowchart explaining an example of a watermark printing process according to the embodiment.

FIG. 14 is a flowchart explaining an example of a watermark printing process according to the embodiment.

As illustrated in FIG. 14, the image forming device 100 determines the division number of the area of the image on the document and the printing content of each area (step S201). For example, a user performs print settings. Consequently, the image forming device 100 determines the division number of the area of the image on the document and the printing content of each area, depending on the number of print settings. In the print settings, whether to include the watermark data is also to be specified. The image forming device 100 reads out the document (step S202), and divides the image of the read document depending on the determined division number (step S203).

Next, the image forming device 100 executes image processing (background skipping, synthesize) (step S204). The image forming device 100 then determines whether image processing is executed on all the areas (step S205). When the image processing is executed on all the areas (Yes at step S205), the image forming device 100 combines all the areas (step S206). When image processing is not executed on all the areas (No at step S205), the image forming device 100 returns to the process at step S204, and executes image processing on the areas not being processed.

The image forming device 100 then determines whether to include watermark data in the areas (step S207). As described above, whether to include the watermark data in the areas is specified in the print settings. When the watermark data is to be included in the areas (Yes at step S207), the image forming device 100 determines whether the watermark data needs to be corrected (step S208). Also, when the watermark data is not to be included in the areas (No at step S207), the image forming device 100 prints the combined image (image not including the watermark data) (step S210).

When the watermark data needs to be corrected (Yes at step S208), the image forming device 100 determines to correct the watermark data (step S209), and prints the combined image including the corrected watermark data (step S210). The correction of the watermark data corresponds to the correction or addition of the watermark data described above. It is also possible to specify which watermark data is used for the correction, at the time of print settings. When there is no need to correct the watermark data (No at step S208), the image forming device 100 prints the combined image including the watermark data (step S210).

Fourth Operation

Figure 15:
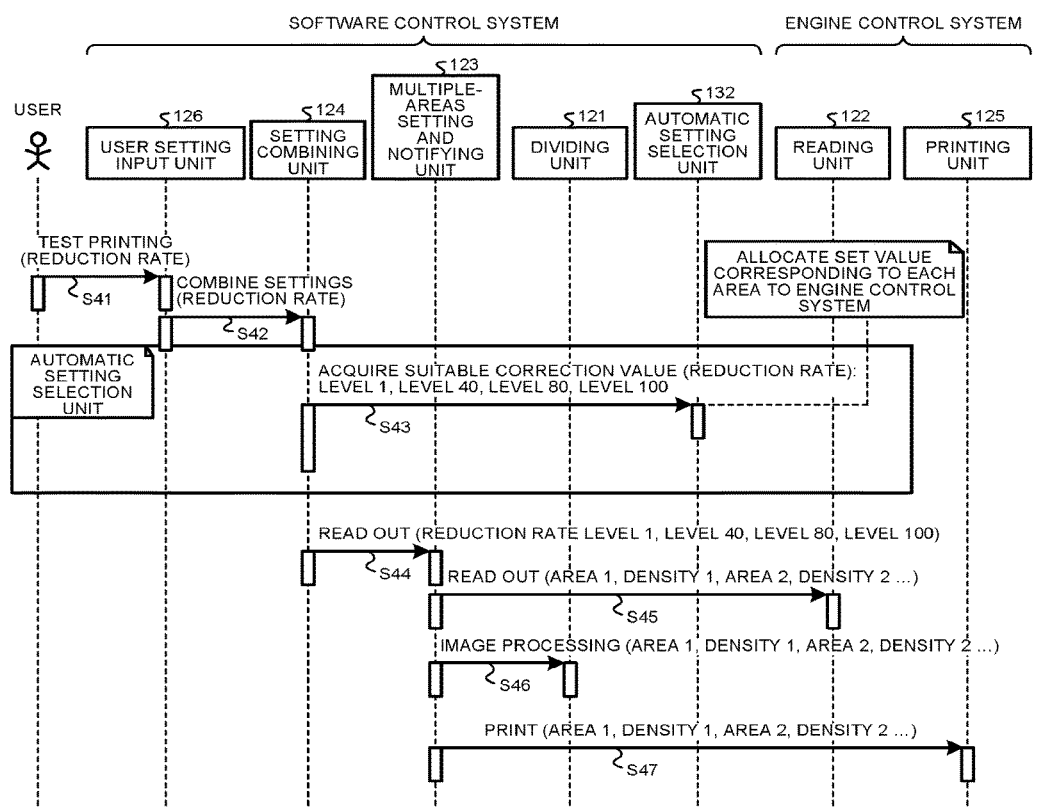
FIG. 15 is a sequence diagram of requests and responses exchanged between the user and the user setting input unit, the setting combining unit, the multiple-areas setting and notifying unit, the dividing unit, an automatic setting selection unit, the reading unit, and the printing unit in the image forming device illustrated in FIG. 6.

FIG. 15 is a sequence diagram of requests and responses exchanged between the user and the user setting input unit 126, the setting combining unit 124, the multiple-areas setting and notifying unit 123, the dividing unit 121, the automatic setting selection unit 132, the reading unit 122, and the printing unit 125 in the image forming device 100 illustrated in FIG. 6.

When an area to be printed is allocated for each of the setting items, while a number of setting items (such as Level 1 to Level 100) are set for the items (such as background skipping) selected by the user, the printed result will be divided into a number of areas. Thus, the user will find it difficult to determine which setting is associated with the image the user desires. The printing result relative to the set value can be printed so that the user can easily distinguish the differences, by narrowing down the setting items (Level 1, Level 40, Level 80, Level 100, and the like) by the device.

When the user instructs the user setting input unit 126 to perform test printing (reduction rate) (step S41), the user setting input unit 126 instructs the setting combining unit 124 to combine the settings (reduction rate) (step S42). The setting combining unit 124 instructs the automatic setting selection unit 132 to acquire suitable values (reduction rate: Level 1, Level 40, Level 80, and Level 100). Consequently, the set value corresponding to each area is allocated to the engine control system 20 (step S43).

The setting combining unit 124 instructs the multiple-areas setting and notifying unit 123 to read out (reduction rate: Level 1, Level 40, Level 80, and Level 100) (step S44), and the multiple-areas setting and notifying unit 123 instructs the reading unit 122 to read out (area 1, density 1, area 2, density 2, . . . ) (step S45). The multiple-areas setting and notifying unit 123 instructs the dividing unit 121 to perform image processing (area 1, density 1, area 2, density 2, . . . ) (step S46), and instructs the printing unit 125 to print (area 1, density 1, area 2, density 2, . . . ) (step S47).

Fifth Operation

When an association between the set value and the divided areas at the time of test printing is registered in a computer program by the user in advance, it is possible to call out the association and print easily, when the user wishes to perform the similar test printing on another document.

Sixth Operation

At the time of test printing, the results acquired by performing the test printing on each of the areas in each setting are stored as history data. The user can reprint by confirming the set value that can acquire the intended image from the results of test printing, and by selecting the set value from the history data of the test print.

Seventh Operation

Figure 16:
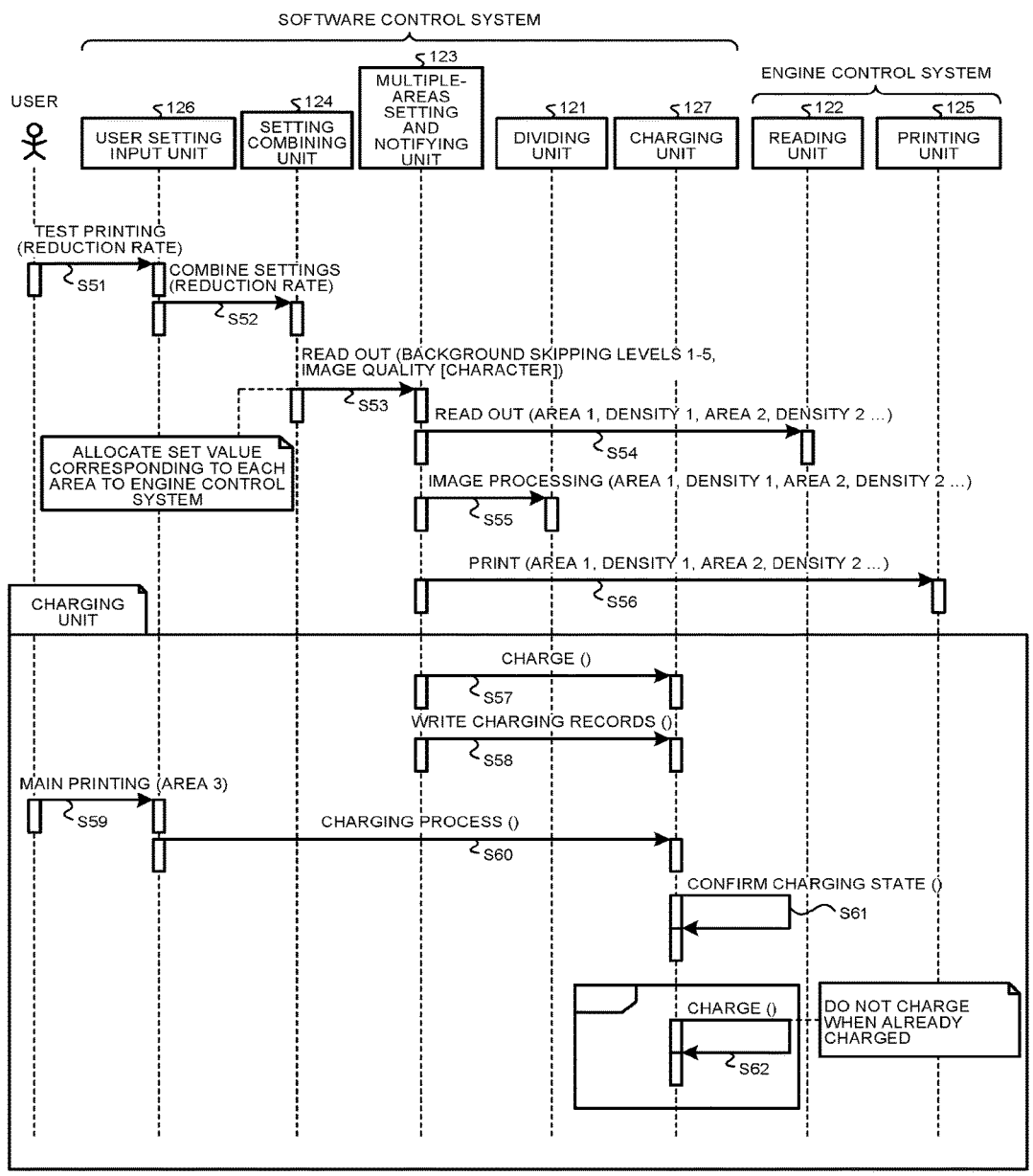
FIG. 16 is a sequence diagram of requests and responses exchanged between the user and the user setting input unit, the setting combining unit, the multiple-areas setting and notifying unit, the dividing unit, a charging unit, the reading unit, and the printing unit in the image forming device illustrated in FIG. 6.

FIG. 16 is a sequence diagram of requests and responses exchanged between the user and the user setting input unit 126, the setting combining unit 124, the multiple-areas setting and notifying unit 123, the dividing unit 121, the charging unit 127, the reading unit 122, and the printing unit 125 in the image forming device 100 illustrated in FIG. 6.

For the user, the content of test printing is not to be counted as chargeable. However, there may be a user who runs away with the sheet on which only the result of test printing is printed. Thus, the service provider has no choice but to charge for the test printing. Consequently, the test printing is charged while the test printing is being executed, and a charging result recording unit records the charge. When a user performs main printing (printing from the history data), the print that is already charged at the time of test printing will not be counted as chargeable, and the user is only charged for the prints that are not recorded as charged. Consequently, it is possible to suitably charge the user.

When a user instructs the user setting input unit 126 to perform test printing (reduction rate) (step S51), the user setting input unit 126 instructs the setting combining unit 124 to combine the settings (reduction rate) (step S52). The setting combining unit 124 instructs the multiple-areas setting and notifying unit 123 to read out (background skipping Levels 1 to 5, image quality [character]). At this point, the set value corresponding to each area is allocated to the engine control system 20 (step S53). The multiple-areas setting and notifying unit 123 instructs the reading unit 122 to read out (area 1, density 1, area 2, density 2, . . . ) (step S54), and instructs the dividing unit 121 to perform image processing (area 1, density 1, area 2, density 2, . . . ) (step S55). The multiple-areas setting and notifying unit 123 instructs the printing unit 125 to print (area 1, density 1, area 2, density 2, . . . ) (step S56).

The charging unit 127 will now be described. The multiple-areas setting and notifying unit 123 instructs the charging unit 127 to charge (step S57), and writes the charging record (step S58). When the user instructs the user setting input unit 126 to perform main printing (area 3) (step S59), the user setting input unit 126 instructs the charging unit 127 to perform a charging process (step S60), and the charging unit 127 confirms the charging state (step S61). The charging unit 127 performs charging when charging is not yet performed (step S62), and does not perform charging when charging is already performed.

Computer Program

The image forming device 100 according to the embodiment described above is implemented by a computer program causing a computer to execute a process. In the following, functions according to the embodiment implemented by the computer program will be described.

For example:

A computer program that can be read by a computer of an image forming device, the computer program causing the computer to execute:

reading out a document and generating an image on the document;

receiving a setting from at least two set values on a print setting, and receiving a plurality of set values on the print setting when test printing is executed for confirming a test result;

dividing an area of the image on the read document, based on number of the received set values;

performing image processing corresponding to each of the set values, on each of the divided areas;

generating a combined image acquired by combining the areas of the image on the document to which the image processing corresponding to each of the set values is performed; and printing the generated combined image.

Such a computer program may also be stored in a computer-readable recording medium.

Recording Medium

In this example, the recording medium includes a computer-readable recording medium such as a compact disc-read only memory (CD-ROM), a flexible disk (FD), and a compact disc-recordable (CD-R); a semiconductor memory such as the flash memory, the RAM, the ROM, and a ferroelectric random access memory (FeRAM); and the HDD.

EFFECTS AND ADVANTAGES

In this manner, in the present embodiments, the output results depending on the set values of the background skipping are output on a single sheet of paper at the time of test copying. Thus, the user can determine the setting close to the intended output result, by the single test copying. As a result, it is possible to confirm the set value for acquiring an optimal output result, without test copying multiple times.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An image forming device comprising:
a reader configured to read out a document and generate an image of the read out document;
a setting receiving circuit configured to receive a setting value from at least two setting values on a print setting, wherein, the setting receiving circuit is configured to receive a plurality of set values on the print setting that are used when test printing is executed for confirming a test result;
an area dividing circuit configured to divide an area of an image on the document that is generated by the reader, based on number of the set values on the print setting when the test printing is executed for confirming the test result received by the setting receiving circuit;
an image processing circuit configured to perform image processing corresponding to each of the set values, on each of a plurality of areas of the image on the document, the areas being divided by the area dividing circuit;
a combined image generating circuit configured to generate a combined image acquired by combining the areas of the image on the document to which the image processing corresponding to each of the set values is performed by the image processing circuit; and
a printer configured to print the combined image generated by the combined image generating circuit.

2. The image forming device according to claim 1, wherein
the setting receiving circuit receives the set values indicating a plurality of levels of background skipping, relative to the print setting indicating the background skipping,
the area dividing circuit divides the area of the image on the document that is generated by the reader, based on number of the levels of the background skipping,
the image processing circuit performs the image processing corresponding to each of the levels of the background skipping, on each of the areas of the image on the document, the areas being divided by the area dividing circuit, and
the combined image generating circuit generates the combined image that is acquired by combining the areas of the image on the document to which the image processing corresponding to each of the levels of the background skipping is performed by the image processing circuit.

3. The image forming device according to claim 1, wherein the image processing circuit performs image processing of synthesizing a set value identification image for identifying each of the set values, on each of the areas of the image on the document, the areas being divided by the area dividing circuit.

4. The image forming device according to claim 1, further comprising:
a watermark printing circuit that controls printing of a watermark image when the combined image is to be printed, wherein
the printer prints the combined image including the watermark image based on control by the watermark printing circuit.

5. The image forming device according to claim 4, wherein
the watermark printing circuit performs control so that all areas of the image on the document include the watermark image.

6. The image forming device according to claim 4, wherein
the watermark printing circuit corrects the watermark image so that the watermark image is to be included in all the areas of the image on the document, or adds a new watermark image in an area where the watermark image is not included, when one of the areas of the image on the document does not include the watermark image.

7. The image forming device according to claim 1, further comprising:
an accumulation circuit configured to accumulate a printing result of the test printing as history data; and
a reprint setting selection circuit configured to receive selection of the history data to be reprinted, wherein
the printer reprints based on the history data the selection of which has been received.

8. The image forming device according to claim 1, further comprising:
a charging circuit configured to perform charging of an amount of cost to a user at a time of printing, wherein
the charging circuit does not perform charging at a time of main printing, when charging has been performed at a time of test printing.

9. The image forming device according to claim 1, wherein
the set values are related to document type.

10. A non-transitory computer-readable recording medium that contains a computer program that causes a computer to execute:
reading out a document and generating an image on the document;
receiving a setting value from at least two setting values on a print setting, and receiving a plurality of set values on the print setting that are used when test printing is executed for confirming a test result;
dividing an area of the image on the read document, based on number of the received set values on the print setting when the test printing is executed for confirming the test result;
performing image processing corresponding to each of the set values, on each of the divided areas;
generating a combined image acquired by combining the areas of the image on the document to which the image processing corresponding to each of the set values is performed; and
printing the generated combined image.

11. An image forming method comprising:
reading out a document and generating an image on the document;
receiving a setting value from at least two setting values on a print setting, and receiving a plurality of set values on the print setting that are used when test printing is executed for confirming a test result;
dividing an area of the image on the read document, based on number of the received set values on the print setting when the test printing is executed for confirming the test result;
performing image processing corresponding to each of the set values, on each of the divided areas;
generating a combined image acquired by combining the areas of the image on the document to which the image processing corresponding to each of the set values is performed; and
printing the generated combined image.

12. The image forming method according to claim 11, wherein the receiving receives the set values indicating a plurality of levels of background skipping, relative to the print setting indicating the background skipping, the dividing divides the area of the image on the read document, based on number of the levels of the background skipping, the performing performs the image processing corresponding to each of the levels of the background skipping, on each of the divided areas, and the generating generates the combined image that is acquired by combining the areas of the image on the document to which the image processing corresponding to each of the levels of the background skipping is performed.

13. The image forming method according to claim 11, wherein the performing performs image processing of synthesizing a set value identification image for identifying each of the set values, on each of the divided areas.

14. The image forming method according to claim 11, further comprising:

controlling printing of a watermark image when the combined image is to be printed, wherein the printing prints the combined image including the watermark image based on the controlling.

15. The image forming method according to claim 14, wherein the controlling printing performs control so that all areas of the image on the document include the watermark image.

16. The image forming method according to claim 14, wherein the controlling printing corrects the watermark image so that the watermark image is to be included in all the areas of the image on the document, or adds a new watermark image in an area where the watermark image is not included, when one of the areas of the image on the document does not include the watermark image.

17. The image forming method according to claim 11, further comprising:

accumulating a printing result of the test printing as history data; and receiving selection of the history data to be reprinted, wherein the printing reprints based on the history data the selection of which has been received.

18. The image forming method according to claim 11, further comprising:

performing charging of an amount of cost to a user at a time of printing, wherein the charging is not performed at a time of main printing, when charging has been performed at a time of test printing.

* * * * *